3,721,093
REACTION PROPULSION ENGINE WITH VAPORIZED FUEL DRIVEN TURBINE
Robert L. Wolf, Chesterfield County, Va., and Rodney McGann, Northridge, Calif., assignors to Texaco Inc., New York, N.Y.
Filed Nov. 20, 1963, Ser. No. 324,932
Int. Cl. F02k *11/00*
U.S. Cl. 60—267                                       1 Claim This invention relates to reaction propulsion engines and to methods of operating them and particularly to relatively small and lightweight air breathing reaction propulsion engines which will be able to accelerate efficiently a load from standstill to hypersonic speeds.

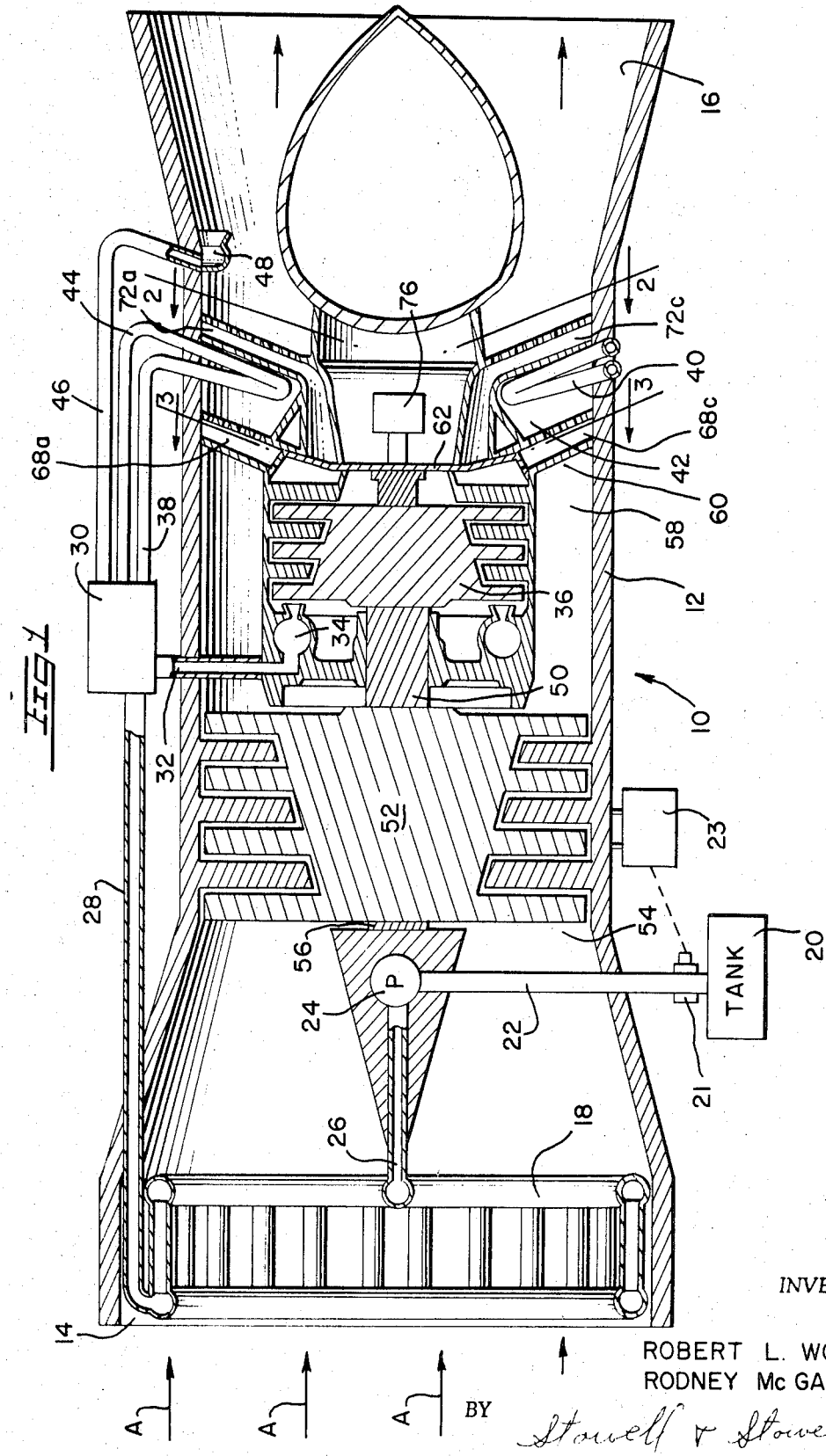

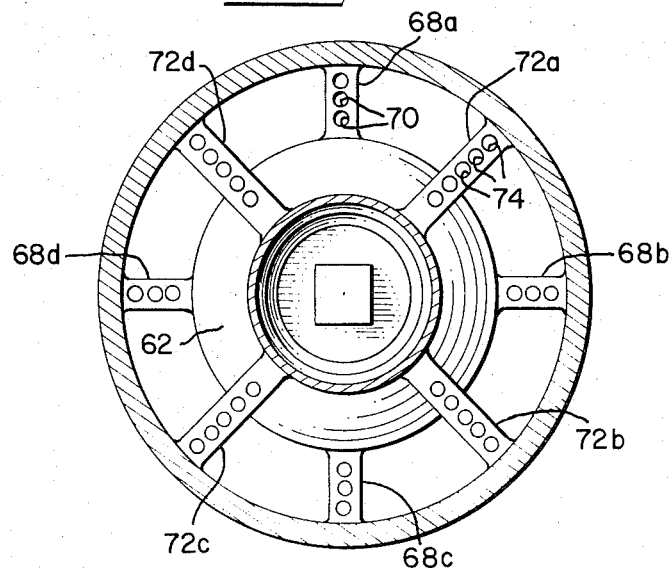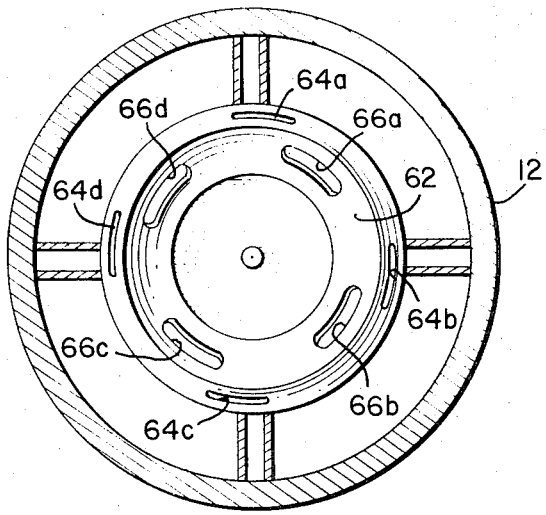

It is a principal object of the present invention to provide an air breathing reaction engine wherein a portion of the energy of the ram air is transferred to the fuel by heat exchange between the ram air and the fuel and wherein further energy may be transferred to the fuel by heat exchange between the fuel and the products of combustion of the engine and thereafter the energy thus transferred is at least in part utilized by expanding the fuel or a portion thereof in a turbine driving an air compressor for the engine.

By locating a heat exchanger in the air inlet, the heat exchanger cools the ingested diffused air so that the engine downstream of the heat exchanger will not be subjected to temperatures exceeding, for example, that corresponding to about Mach 3 (about 650° F.) during Mach 8 flight conditions.

A further object is to provide such an engine wherein the air stream is more easily compressed by cooling the ingested air prior to compression.

Another object of the present invention is to provide an engine having a regenerative heat exchanger in the combustion chamber of the engine whereby from launching velocities to the low hypersonic range of about Mach 4 the regenerative heat exchanger is employed to provide a portion of the energy required to operate the air compressor.

Another object of the invention is to provide an engine wherein the turbine is not aerodynamically coupled to the compressor whereby the power supply to the turbine does not depend on air flow through the compressor eliminating the need for variable geometry compressors or air bleeding while operating over a very wide range of flight conditions.

Another object of the present invention is to provide an air turbo engine wherein the air bypasses the turbine and the full compressor discharge pressure is discharged into the combustion chamber of the engine.

For high cooling efficiency, it is desirable that the fuel selected have a high heat capacity within the operating temperature range to provide for a high absorption of energy per pound of fuel. For efficient conversion of energy to thrust in the expansion process, the fuel should be one which provides a low average molecular weight in the exhaust gases. Within these limitations a considerable range of fuels is available from which selection may be made in the light of other properties of the fuels and the effect on the particular demands to be made on the engine. Among the fuels of interests are hydrogen and hydrogen-bearing compounds such as ammonia, methyl alcohol, ethyl alcohol, methane, ethylene glycol and cyclohexane.

Of these fuels, fuels which undergo endothermic decomposition or dissociation at temperatures between their storage temperature and the turbine and/or combustor entrance temperature are particularly suited for use in the engine. The most suitable fuels will dissociate at these temperatures to hydrogen and other relatively low molecular weight compounds without the formation of free carbon particles. Preferred examples of such fuels are ammonia, methyl alcohol, ethylene glycol and cyclohexane.

The preferred high heat capacity fuels, ammonia, methyl alcohol, ethylene glycol and cyclohexane, dissociate into hydrogen and nitrogen, hydrogen and carbon monoxide, hydrogen and carbon monoxide and hydrogen and benzene, respectively. The dissociation is endothermic and the resulting gaseous products are of low molecular weight and are exceptionally clean; that is, they and their combustion products have little or no tendency to foul the engine as they contain no free carbon.

In general, the invention comprises a reaction propulsion system including means providing a combustion chamber having at its rearward end an impulse expansion outlet nozzle, means providing a ram air intake, means directing air from the ram air intake to the forward end of the combustion chamber, a fuel storage chamber, indirect heat exchange means in heat exchange contact with the ram air in said air directing means, means directing fuel from said storage chamber through said heat exchange means, an air compressor providing a portion of the air directing means between the heat exchange means and the forward end of the combustion chamber, a direct expansion turbine for driving said compressor, a regenerative heat exchanger in said combustion chamber, means for selectively directing at least a portion of the fuel passing through said heat exchange means to said regenerative heat exchanger, means directing at least a portion of the fuel from said heat exchange means and the fuel passing through the regenerative heat exchanger through the direct expansion turbine, and means for selectively directing the fuel exhausting from the turbine into the combustion chamber selectively up and down stream of the regenerative heat exchanger.

The invention will be more particularly described with reference to the illustrative embodiments thereof shown in the drawings wherein:

FIG. 1 is a schematic sectional view of a reaction propulsion engine embodying the principles of the present invention;

FIG. 2 is a section substantially on line 2—2 of FIG. 1; and

FIG. 3 is a section substantially on line 3—3 of FIG. 1.

Referring to the drawings, 10 generally designates a reaction propulsion engine embodying the principles of the present invention. The engine includes a shell 12 having a forward end 14 and a rearward end 16. The forward end 14 of the shell or casing 12 connects to the inlet duct for ram air, the path of the ram air being indicated by the directional arrows A.

In the forward end 14 of the ram air passage is an indirect heat exchange means 18 having its outer surface in contact with the ram air entering the engine. The internal surfaces of the indirect heat exchange means provides a path for the flow of fuel. Fuel from the fuel tank 20 is directed via conduit 22 through turbine driven pump 24 and conduit 26 to the indirect heat exchange means 18. The rate of flow of fuel to the ram air heat exchanger 18 may be controlled within wide limits by varying the output from the fuel pump 24 or by providing a control valve 21 in the fuel line. The pump output volume or the control valve 21 may be manually controlled and/or as indicated in the drawing the control thereof may be provided by the compressor outlet temperature sensing means 23 which would insure that sufficient fuel is passed to the heat exchanger 18 to maintain limits on the turbine inlet temperature and the compressor discharge temperature. From the indirect heat exchange means 18 a conduit 28 directs the fuel to a three-way fuel flow control valve 30. From the three-way control valve 30, the fuel or a portion thereof may be directed to conduit 32 connecting the control valve with a direct expansion turbine nozzle ring 34 which directs the fuel to the turbine blades of the direct expansion turbine 36.

A portion of the fuel directed to the fuel flow control valve 30 may also be selectively directed via conduit 38 to a regenerative heat exchange means 40 positioned in the combustion chamber 42 of the reaction propulsion engine. The return line 44 from the regenerative heat exchange means 40 flows to the flow control valve 30 where it is mixed with the portion of the fuel flowing from the valve means through conduit 32 to the annular nozzle ring 34 of the turbine 36. The return line 44 or the control valve 30 is provided with flow restricting means to produce a pressure drop between conduit 38 and return line 44 from the regenerative heat exchanger 40. Also a portion of the fuel flowing from the indirect heat exchanger means 18 to the flow control valve means 30 may be directed via conduit 46 to fuel outlet thrust nozzle means 48 positioned in the rearward portion of the combustion chamber 46. Where desired the thrust nozzle means 48 may be positioned external of the combustion chamber. The use of such a thrust nozzle would have particular utility where the amount of fuel needed to cool ram air is greater than the amount which could be burned stoichiometrically with the available air supply.

The direct expansion turbine 36 is connected through shaft 50 to the rotor 52 of an air compressor 54. Shaft 56 extending from the forward end of rotor 52 of the air compressor drives the fuel pump 24.

The fuel issuing from the turbine 36 is selectively directed, by valve plate means 62 into the forward end of the combustion chamber 42, the rearward end of combustion chamber 42, or into both the forward and the rearward ends of the combustion chamber in selected proportions. Referring particularly to FIGS. 2 and 3 of the drawing, the valve plate means 62 is provided with a plurality of arcuate ports 64a, b, c, and d and 66a, b, c, and d.

Ports 64a cooperates with a fuel outlet conduit 68a provided with a plurality of fuel outlet nozzles 70. Likewise, port 64b cooperates with fuel outlet conduit 68b; port 64c cooperates with fuel outlet conduit 68c; and fuel outlet port 64d cooperates with fuel outlet conduit 68d.

Outlet port 66a cooperates with fuel outlet conduit 72a provided with a plurality of outlet ports or nozzles 74. Similarly, valve port 66b cooperates with fuel outlet conduit 72b; fuel outlet valve port 66C cooperates with fuel outlet conduit 72c; and valve port 66d cooperates with fuel outlet conduit 72d.

The valve plate 62 is rotatably mounted within the engine housing and is selectively movable by control means generally designated 76 whereby all of the fuel exhausting from the turbine 36 may be directed through valve ports 64a, b, c and d into fuel outlet conduits 68a, b, c, and d; all of the fuel exhausting from the turbine 36 may be directed through valve ports 66a, b, c, and d to fuel outlet conduits 72a, b, c, and d; or a portion of the fuel may be directed through valve ports 64a, b, c, and d to fuel outlet conduits 68a, b, c, and d and the other portion may be directed through valve port 66a, b, c, and d to fuel outlet conduits 72a, b, c, and d as to be more fully described hereinafter.

It will be particularly noted from FIG. 1 of the drawings that fuel outlet conduits 68a, b, c, and d are adjacent the forward fuel outlet conduits 68a, b, c, and d are adjacent the forward end of the combustion chamber 42 while fuel outlet conduits 72a, b, c, and d are spaced downstream thereof within the combustion chamber and that the regenerative indirect heat exchanger 40 is positioned in the combustion chamber intermediate said two groups of fuel outlet conduits 68a, b, c, d and 72a, b, c, and d. Also, in the illustrated form of the invention, the regenerative heat exchanger 40 is positioned upstream of the fuel outlet nozzle 48, and the fuel outlet nozzle 48 is positioned downstream of fuel outlet conduits 72a, b, c, and d. However, the fuel outlet nozzle 48 and fuel outlet conduits 72a, b, c, and d may be positioned in the same transverse plane without affecting the operation of the improved engine of the invention.

As hereinbefore discussed, for high cooling efficiency and to provide a high absorption of energy per pound of fuel, it is desirable that the fuel selected have a high heat capacity within the expected operating temperature range of the engine. At the same time for efficient conversion of energy into thrust in the expansion process, the fuel should be one which provides low average molecular weight components in the exhaust gases. Thus, cryogenic hydrogen or fuels which undergo endothermic decomposition at temperatures between their storage temperature and the turbine and/or combustor entrance temperatures are particularly suited for use in the system of the invention.

When such fuels are used at relatively low flight speeds below about Mach 1.5 in a system where the incoming air and a regenerative heat exchanger are used to heat the fuel prior to combustion, there will be very little heating of the fuel by the incoming air. Most of the heat required to decompose and/or evaporate the fuel and heat the fuel to the turbine inlet temperature required to operate the air compressor will come from the regenerative heat exchanger, As the flight speed and the temperature of the inlet air increase, there will be more cooling of the air ahead of the compressor and hence more heating of the fuel prior to its passage to the turbine and/or combustion zone. Thus, less heat will be required from the combustion zone via the regenerative heat exchanger and less fuel will be programmed through the regenerative heat exchanger located in the combustion area prior to its expansion across the turbine. At still higher flight speeds, all of the required heat will come from the cooling of the inlet air and no heat will be taken from the combustion zone via the regenerative heat exchanger.

The air to fuel indirect heat exchanger located ahead of the air compressor serves three main purposes. The first is to increase the available turbine work of the fuel by heat addition without combustion while lowering the work required to compress the air thereby making the cycle more efficient. The second is to cool the incoming air to acceptable temperature levels, preferably below 1000° F., to avoid excessive exit temperatures and dissociation of the products in the combustion zone. The third is to increase the density of the air through cooling to give a higher mass flow per unit of compressor frontal area and a resultant higher level of thrust.

At higher flight Mach numbers, it becomes increasingly important to cool the incoming air, down to acceptable levels for the compressor. It then becomes necessary to run the heat exchanger richer than at lower Mach numbers, i.e., using an amount of fuel in excess of that which can be expanded across the turbine without overspeeding the rotating assembly. The excess fuel is passed directly to the combustor for combustion along with the fuel that has been expanded across the turbine. A portion of the fuel used in cooling the inlet air may be burned stoichiometrically with the air in the combustor while the remainder may be expanded directly to the atmosphere through a separate thrust nozzle as described hereinbefore. The proportion separately expanded is determined by the maximum exhaust gas temperature and the maximum degree of dissociation to be maintained. The use of endothermically dissociating fuels according to the process of our invention minimizes the expenditure of uncombusted fuel.

EXAMPLE

An engine of the type illustrated in FIGS. 1 through 3 can be operated efficiently through the velocity range from static launch to Mach 10 and altitudes up to 150,000 feet using the endothermically dissociating fuels of the invention or cryogenic hydrogen. Below Mach 4 insufficient heat is transferred from the incoming ram air to the fuel in the heat exchanger 18 to effectively operate the turbine which, in turn, drives the air compressor 54 and the fuel pump 20. Under these conditions, the three-way flow control valve means 30 directs a portion of the fuel passing to the valve from the heat exchanger 18 to conduit 38 for passage through the regenerative heat exchanger 40. Under these conditions, the control means 76 for the flow control valve plate 62 adjusts the valve ports 64a, b, c, and d and 66a, b, c, and d such that all of the fuel exhausting from the turbine 36 flows through valve ports 64a, b, c and d and into fuel outlet conduits 68a, b, c and d whereby the fuel is burned in the combustion chamber forwardly of the regenerative heat exchanger 40. As the speed of the vehicle increases and the temperature of the ram air passing the heat exchanger 18 increases, less and less of the fuel is directed, by flow control valve means 30, to the regenerative heat exchanger 40 and proportionately less of the fuel exhausting from the turbine 36 is directed to the fuel outlet conduits 68a, b, c, and d and a greater portion is discharged through valve ports 66a, b, c, and d into the fuel outlet conduits 72a, b, c, and d. The fuel issuing from the fuel outlet conduits 72a, b, c, and d is burned within the combustion chamber downstream of the regenerative heat exchanger which prevents overheating of the fuel passing therethrough and burnout of the regenerative heat exchanger 40. Further, as less fuel is needed to drive the turbine 36, as the temperature of the fuel passing to the turbine increases, the flow control valve means 30 directs excess fuel via conduit 46 directly into the combustion chamber via outlet conduits 48, which, as hereinbefore described, may be in the same transverse plane as fuel outlet conduits 72a, b, c, and d. The controllers for fuel flow control valve means 30 and controller 76 for valve plate means 62 may be fuel, turbine or compressor temperature responsive, altitude responsive, vehicle speed responsive, turbine speed responsive or a combination of two or more of these factors, or the valves may be connected to mechanical or electronic programming means which may be of the ground control or of the pre-set type as is known in the art. About Mach 4 none of the fuel passing from the heat exchanger 18 is passed to the regenerative heat exchanger 40 and the inlet air heating of the fuel provides all of the energy requirements of the turbine.

Related subject matter is disclosed in co-pending application Ser. No. 152,097, Robert L. Wolf et al., filed Nov. 13, 1961.

Where desired, the cold fuel exhausting from the turbine may be utilized to cool engine parts such as the combustor case, exhaust nozzle, etc. prior to combustion of the fuel with the compressed air in the combustor.

We claim:

1. A reaction propulsion system including means providing a combustion chamber having at its rearward end an impulse expansion outlet nozzle, means providing a ram air intake, means directing air from the ram air intake to the forward end of the combustion chamber, a fuel storage chamber, indirect heat exchange means in heat exchange contact with the ram air in said air directing means, means directing fuel from said storage chamber through said heat exchange means, an air compressor providing a portion of the air directing means between the heat exchange means and the forward end of the combustion chamber, a direct expansion turbine for driving said compressor, a regenerative heat exchanger in said combustion chamber, means for selectively directing at least a portion of the fuel passing through said heat exchange means to said regenerative heat exchanger, means for directing a portion of the fuel passing through the heat exchange means to the combustion chamber downstream of the regenerative heat exchanger, means for directing the other portion of the fuel from said heat exchange means and the fuel passing through the regenerative heat exchanger through the direct expansion turbine, and means for directing the fuel exhausting from the turbine into the combustion chamber selectively up and downstream of the regenerative heat exchanger.

References Cited
UNITED STATES PATENTS

| 2,617,361 | 11/1952 | Neal | 60—35.6 X |
| 2,883,828 | 4/1959 | Howell | 60—35.6 RT |
| 3,000,176 | 9/1961 | Kuhrt | 60—35.6 D |
| 3,040,519 | 6/1962 | Rae | 60—35.6 RT |

SAMUEL FEINBERG, Primary Examiner